US00RE37761E

(19) United States
(12) Reissued Patent
Back

(10) Patent Number: US RE37,761 E
(45) Date of Reissued Patent: Jun. 25, 2002

(54) CHARACTER DISPLAY APPARATUS FOR AN INTELLIGENCE TELEVISION

(75) Inventor: Dong-Cherl Back, Suwon (KR)

(73) Assignee: Samsung Electronics Co., Ltd., Suwon (KR)

(21) Appl. No.: 09/539,609

(22) Filed: Mar. 31, 2000

Related U.S. Patent Documents

Reissue of:
(64) Patent No.: 5,734,437
Issued: Mar. 31, 1998
Appl. No.: 08/731,310
Filed: Oct. 15, 1996

(30) Foreign Application Priority Data

Oct. 13, 1995 (KR) ..... 95-35288

(51) Int. Cl.[7] ..... H04N 5/445
(52) U.S. Cl. ..... 348/563; 348/564; 348/569; 348/706
(58) Field of Search ..... 348/563, 564, 348/569, 588, 589, 600, 598, 705, 706; H04N 5/445

(56) References Cited

U.S. PATENT DOCUMENTS

| | | | | |
|---|---|---|---|---|
| 4,518,822 A | | 5/1985 | Martinez | |
| 4,599,644 A | | 7/1986 | Fischer | |
| 4,700,378 A | | 10/1987 | Brown | |
| 4,734,765 A | | 3/1988 | Okada et al. | |
| 4,849,818 A | | 7/1989 | Hartmann et al. | |
| 4,893,248 A | | 1/1990 | Pitts et al. | |
| 4,907,079 A | | 3/1990 | Turner et al. | |
| 5,018,186 A | | 5/1991 | Kimura et al. | |
| 5,063,587 A | | 11/1991 | Semasa et al. | |
| 5,075,771 A | | 12/1991 | Hashimoto | |
| 5,142,532 A | | 8/1992 | Adams | |
| 5,173,778 A | * | 12/1992 | Sasaki | 348/569 |
| 5,191,410 A | | 3/1993 | McCalley et al. | |
| 5,210,611 A | * | 5/1993 | Yee | 348/569 |
| 5,418,576 A | | 5/1995 | Ross | |
| 5,721,593 A | * | 2/1998 | Suh | 348/564 |

* cited by examiner

*Primary Examiner*—Sherrie Hsia
(74) *Attorney, Agent, or Firm*—Robert E. Bushnell, Esq.

(57) ABSTRACT

A character display apparatus for an intelligence television is provided. The apparatus enables the television to simultaneously display a television broadcast signal and a communication signal corresponding to communications service information supplied via a value added communication network. For example, the apparatus may contain an information processing system, a signal switching device, display driver, and a microcomputer. The information processing system receives the communication service information from the value added communication network and outputs a corresponding screen information signal and a switching control signal. The signal switching device selects and switches between the screen information signal and the television broadcast signal based on the switching control signal. Then, the switching device outputs a corresponding selected signal. The display driver inputs the selected signal, superimposes an on screen display signal onto the selected signal to produce a superimposed signal, and outputs the superimposed signal to a display. The microcomputer outputs an actuating signal to instruct the information processing system to receive the communication service information from the value added communication network and outputs the on screen display signal to the display driver.

52 Claims, 3 Drawing Sheets

(Amended)

FIG. 1 (Amended)
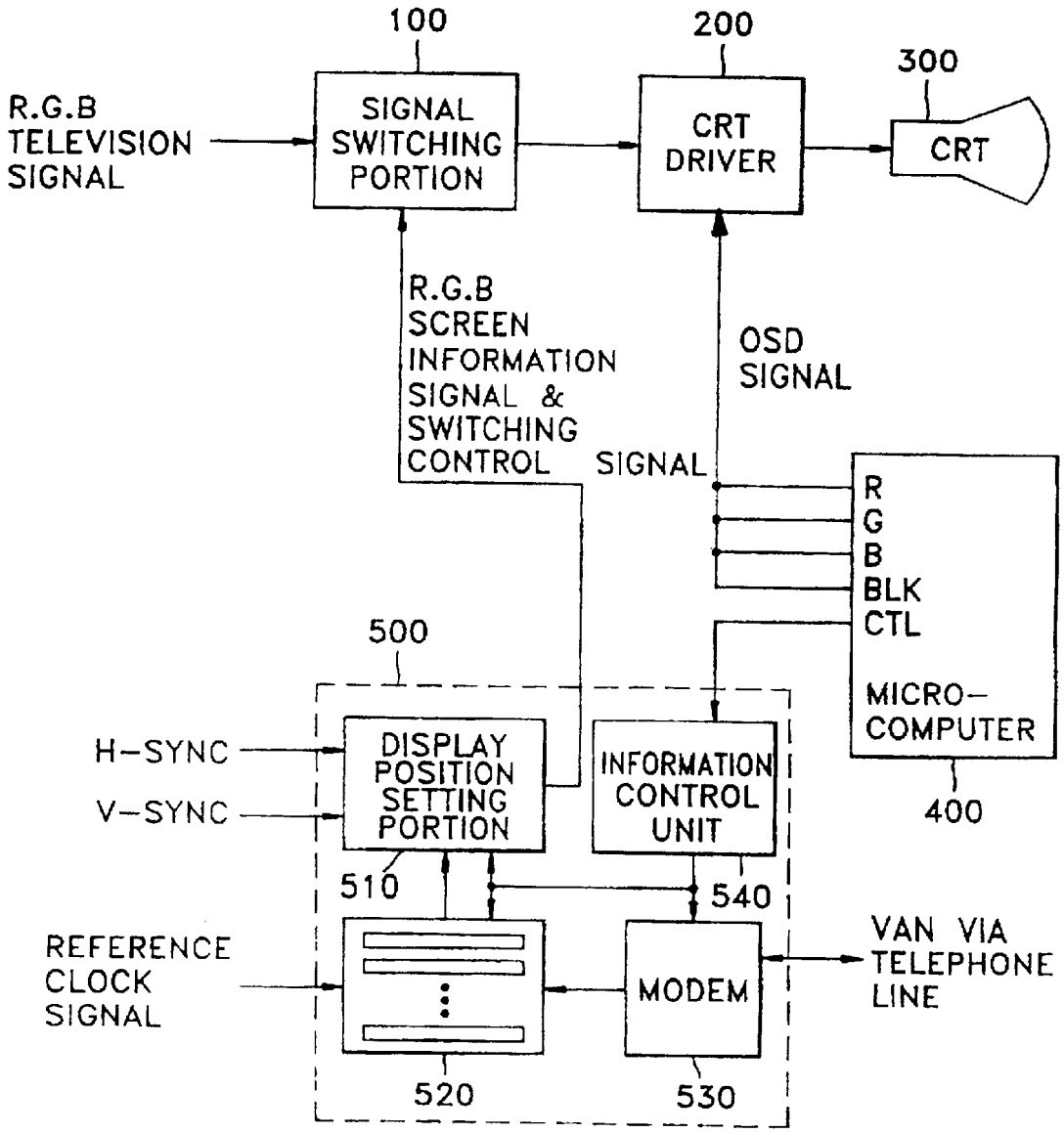

CHARACTER DISPLAY APPARATUS FOR AN INTELLIGENCE TELEVISION

Matter enclosed in heavy brackets [ ] appears in the original patent but forms no part of this reissue specification; matter printed in italics indicates the additions made by reissue.

RELATED APPLICATIONS

The present application is based on Korean Patent Application No. 35288/1995 which is incorporated herein by reference for all purposes.

FIELD OF THE INVENTION

The present invention relates to a character display apparatus for an intelligence television. More specifically, the present invention relates to a character display apparatus which enables textual and/or other information from a communication service to be simultaneously displayed on the intelligence television with a broadcast signal.

BACKGROUND OF THE INVENTION

An intelligence television includes an information processing system which is connected to a value added communication network (VAN) to enable it to receive communication data from the VAN. After receiving such information, the processing system outputs red, green, and blue (RGB) information signals which correspond to the communication data and outputs a related switching control signal. The television also contains RGB switches located inside the television receiver for switching between television RGB signals received via an antenna and the RGB information signals output from the information processing system. In particular, the RGB switches switch between the two types of RGB signals in accordance with the switching control signal output from the processing system.

Since communication information relating to various communication services (e.g. securities information, news, weather, and television programming information) can be transmitted via a VAN and viewed on an intelligence television, a viewer who is not skilled in computers can conveniently obtain the communication information. However, the intelligence television cannot display the communication information immediately after it is received and cannot display it while the viewer is watching a broadcast television program. Accordingly, an apparatus which enables a viewer to view the communication information while it is being received and/or view such information simultaneously with a broadcast television program is needed.

SUMMARY OF THE INVENTION

In order to overcome the above disadvantages, an object of the present invention is to provide a character display apparatus for an intelligence television in which characters can be displayed on the top or bottom of a screen and move from one side of the screen to the other side of the screen while a viewer is watching television.

In order to achieve the above object, a character display apparatus for an intelligence television which is capable of simultaneously displaying a television broadcast signal and a communication signal corresponding to communication service information supplied via a value added communication network is provided. In particular, the display apparatus comprises: an information processing system which receives said communication service information from said value added communication network and outputs a corresponding screen information signal and a switching control signal; signal switching means for selecting and switching between said screen information signal and said television broadcast signal based on said switching control signal and for outputting a corresponding selected signal; a display driver which inputs said selected signal, superimposes an on screen display signal onto said selected signal to produce a superimposed signal, and outputs said superimposed signal to a display; and a microcomputer which outputs an actuating signal to instruct said information processing system to receive said communication service information from said value added communication network and which outputs said on screen display signal to said display driver.

Accordingly, the viewer can view the communication service information while simultaneously watching television. Also, since the information may be displayed as a line of characters which successively moves across the screen, displaying the characters on a limited portion of the screen is possible.

BRIEF DESCRIPTION OF THE DRAWINGS

The above objects and advantages of the present invention will become more apparent by describing in detail preferred embodiments thereof with reference to the attached drawings in which:

FIG. 1 illustrates a character display apparatus for an intelligence television in accordance with one embodiment of the present invention;

DETAILED DESCRIPTION OF THE INVENTION

The following description of the preferred embodiments discloses specific configuration and components. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various features and structures of the present invention which would be known to one skilled in the art are omitted for the sake of clarity and brevity.

Figure 2:
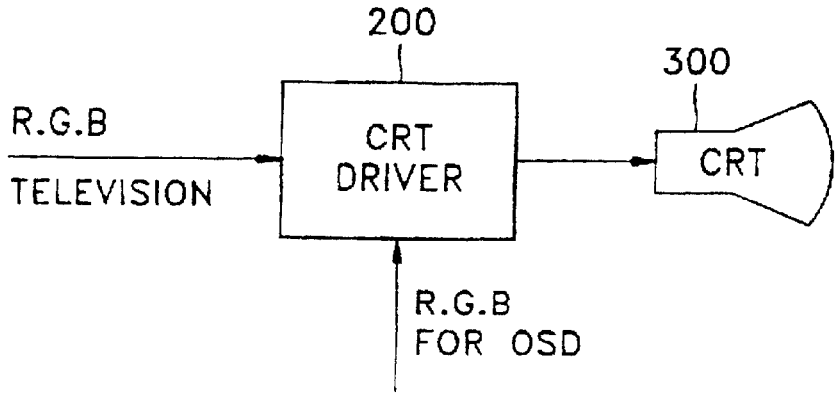
FIG. 2 (PRIOR ART)
FIG. 2 illustrates a conventional on screen display (OSD) character display apparatus.

FIG. 2 illustrates a conventional on screen display (OSD) character display apparatus. Specifically, the apparatus comprises a cathode ray tube (CRT) driver 200 which inputs an RGB television signal and an RGB OSD signal and which superimposes such signals to produce a superimposed signal. Subsequently, the superimposed signal is output to and displayed by a CRT 300. In general, the OSD characters represented by the OSD signal and the position at which the characters are to be displayed on the CRT 300 are determined by an OSD character generator that supplies the RGB OSD signal to the CRT driver 200. Furthermore, since the RGB OSD signal is selected before the RGB television signal is selected, the OSD characters are superposed on the RGB television signals and displayed on the CRT 300.

In the present invention, communication information is displayed on an intelligence television, and the characters corresponding to the information may be simultaneously displayed on the television with a television broadcast signal. For example, the characters may successively move from the right of the screen to the left of the screen as the television broadcast signal is displayed.

FIG. 1 illustrates a character display apparatus for an intelligence television in accordance with one embodiment of the present invention. As shown in the figure, the apparatus comprises a signal switching portion 100, a CRT driver 200, a CRT 300, a microcomputer 400, and an information processing system 500.

The processing system 500 is connected to a value added communication network (VAN) and receives communication information relating to a value added communication service. After receiving the information, the processing system 500 converts it into an RGB screen information signal and outputs the signal to the signal switching portion 100.

The signal switching portion 100 inputs the RGB screen information signal and an RGB television signal and selectively outputs one or both of the signals as a selected signal. For example, the switching portion may output only the RGB screen information signal, only the RGB television signal, or the RGB screen information signal superimposed upon the RGB television signal as the selected signal.

The CRT driver 200 inputs an OSD signal and the selected signal and superimposes the OSD signal upon the selected signal to produce a superimposed signal. Then, the driver 200 outputs the superimposed signal to the CRT 300 so that the signal can be displayed.

The microcomputer 400 generates and outputs an actuating signal to the information processing system 500 to command the processing system 500 to input communication information from the VAN. Also, the microcomputer 400 generates the OSD signal which is output to the CRT driver 200.

The operation of the character display apparatus will be described in more detail below. When the microcomputer 400 outputs the appropriate actuating signal, the information processing system 500 begins receiving communication information from the VAN, decoding the communication information, and outputting corresponding RGB screen information signals. Furthermore, the processing system 500 contains an information control unit 540 which comprises a CPU (not shown), a program read only memory (ROM) (not shown), a main controller (not shown), a digital-to-analog (D/A) converter (not own), a palette random access memory (RAM) (not shown), and a memory portion (not shown).

The CPU performs various control functions, transmission functions, and other data operations relating to the system 500. The program ROM stores programs which are necessary for the operation of the system 500 and stores various types of data which are utilized by the CPU. The main controller generates control signals which are used to control the overall operation of the system 500 and which are used to receive, display, and process the communication data. The D/A converter receives graphics data from the main controller, inputs RGB signals from the internal palette RAM, and converts the graphics data and RGB signals into analog signals. Furthermore, the memory portion reads and writes communication data under the control of the main controller.

The information processing system 500 also comprises a modulator-demodulator (MODEM) 530, a first in first out (FIFO) memory 520, and a display position setting portion 510. The MODEM 530 transmits data to or receives data from a host computer (not shown) via the VAN under the control of the main controller. The FIFO memory 520 successively stores the data input from the MODEM 530 and outputs such data in accordance with a reference clock signal.

Then, the display position setting portion 510 inputs the data from the FIFO memory 520, determines the position of the CRT 300 at which such data will be displayed, and outputs the data as an RGB screen information signal. In addition, the setting portion 510 outputs a corresponding switching control signal.

The signal switching portion 100 inputs the RGB television signal supplied by a source (e.g. a cable or an antenna) and the RGB screen information signal. Then, the switching portion 100 performs the switching operation on the two RGB signals based on the switching control signal output from the processing system 500. For example, the switching portion 100 may output only the RGB television signal or may output the RGB screen information signal superimposed upon the RGB television signal based on the switching control signal. Then, the resultant signal is output as the selected signal to the CRT driver 200.

The microcomputer 400 generates an OSD signal for displaying various information (e.g. the current volume setting, the currently tuned channel, and the current time) and outputs the OSD signal to the CRT driver 200. The driver 200 inputs the selected signal from the switching portion 100 and the OSD signal from the microcomputer 400 and superimposes the OSD signal on the selected signal to produce a superimposed signal. Then, the superimposed signal is transmitted to the CRT 300 in order to display it on the CRT 300.

Figure 3:
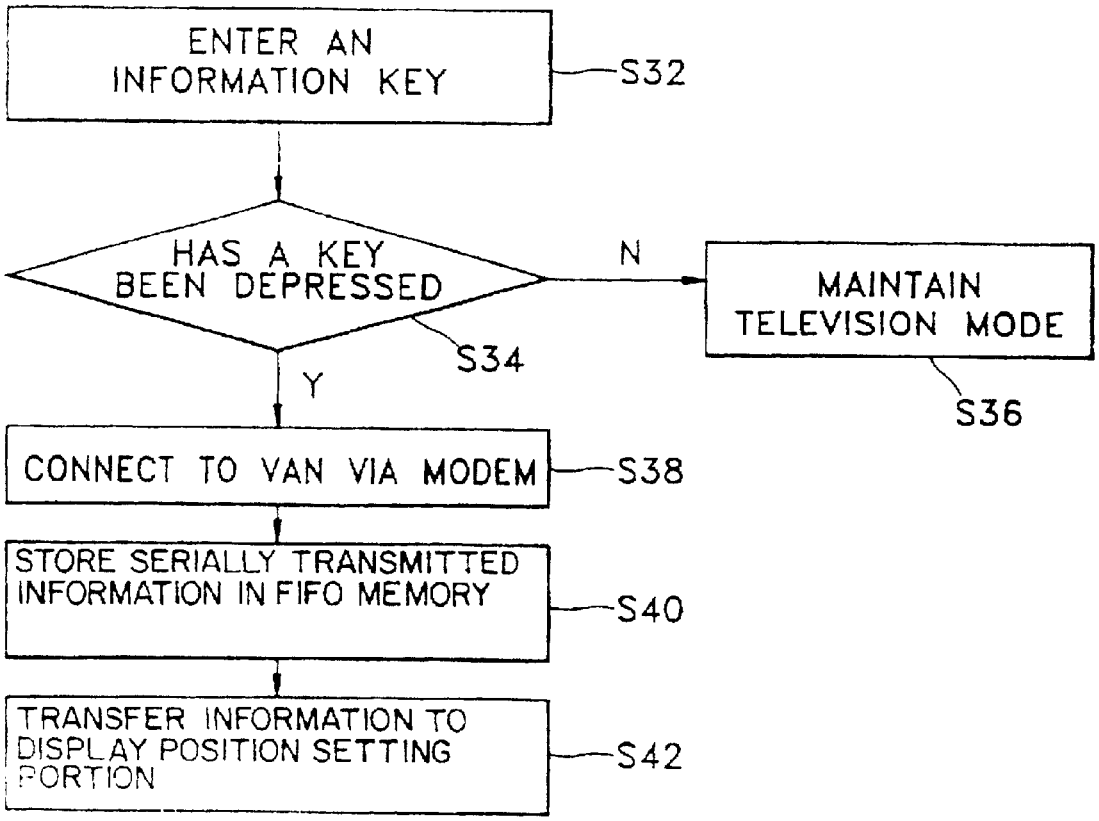
FIG. 3 is a flow chart showing an operation of the microprocessor and information processing system illustrated in FIG. 1.

FIG. 3 represents a flow chart which further describes the operation and interrelation of the microcomputer 400 and the information processing system 500. For example, one manner by which the communication information may displayed on the CRT 300 is if the viewer presses an information key on an input device (e.g. a remote control) (step S32). If the key has not been depressed (step S34), the microcomputer 400 maintains the apparatus in a television mode (step S36).

On the other hand, if the viewer has depressed the information key (step S34), the microcomputer 400 generates and outputs an actuation signal to instruct the processing system 500 to establish a connection to the VAN via the MODEM 530 (step S38). Consequently, the communication information is transmitted from the host computer to the information processing system 500 via the VAN and stored in the FIFO memory 520 as stored data (step S40).

The FIFO memory 520 successively transfers the stored data to an internal upper register based on the reference clock signal, and such data is successively output to the display position setting portion 510 (step S42). For example, if the communication information corresponds to textual information (e.g. a sentence), the textual information may be output to the display position setting portion beginning with the first character of the sentence.

In addition, the display position setting portion 510 inputs horizontal and vertical synchronization signals H-SYNC and V-SYNC and calculates the position at which the communication information is to be displayed on the CRT 300 based on such signals H-SYNC and V-SYNC. Then, the portion 510 outputs a signal to the switching portion 100 which relates to such position. For example, the position at which the information is to be displayed may be contained in the switching control signal output by the setting portion S-10. As a result, the communication information which is output to the signal switching portion 100 as an RGB screen information signal may be superimposed on the RGB television signal in accordance with the switching control signal. Consequently, the communication information may be displayed on a position of the CRT 300 which corresponds to the position at which the information is superposed on the RGB television signal.

Figure 4:
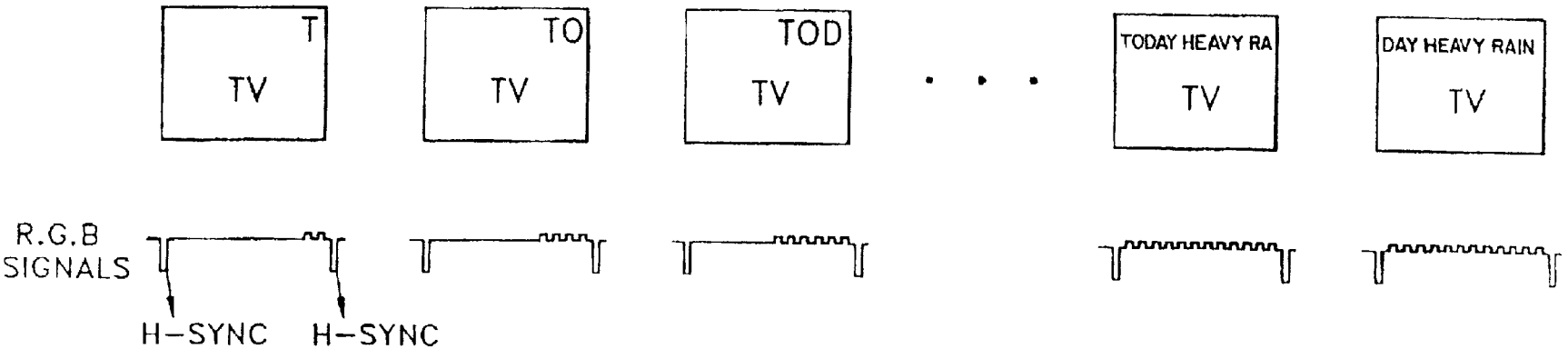
FIG. 4 illustrates an example of how communication information is displayed by the present invention.

One example of the manner in which the RGB screen information signal and the RGB television signal may be displayed on the CRT 300 is illustrated in FIG. 4. As shown in the figure, the RGB screen information signal corresponds to the phrase "TODAY HEAVY RAIN", and such phrase sequentially scrolls from the right side of the CRT 300 to the left side of the CRT 300. Furthermore, the RGB screen information signal can be displayed simultaneously with the RGB television signal and can be displayed immediately after it has been received by the information processing system 500. As a result, a foreign movie and communication information which is transmitted via a VAN (e.g. news information which is displayed as written text) can be simultaneously displayed on the television without having to display a screen which is dedicated to displaying the communication information.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A character display apparatus for an intelligence television which is capable of simultaneously displaying a television broadcast signal and a communication signal corresponding to communication service information supplied via a value added communication network, said apparatus comprising:

an information processing system which receives said communication service information from said value added communication network and outputs a corresponding screen information signal;

signal switching means for selecting and switching between said screen information signal and said television broadcast signal and for outputting a corresponding selected signal; and a display driver which inputs said selected signal and outputs said selected signal to a display.

2. A character display apparatus for an intelligence television according to claim 1, wherein said display driver superimposes an on screen display signal onto said selected signal output from said signal switching means to produce a superimposed signal and wherein said display driver outputs said superimposed signal to said display.

3. A character display apparatus for an intelligence television according to claim 1, wherein said information processing system generates a switching control signal and wherein said signal switching means selects and switches between said screen information signal and said television broadcast signal in accordance with said switching control signal.

4. A character display apparatus for an intelligence television according to claim 3, wherein said information processing system generates said switching control signal based on a horizontal synchronization signal and a vertical synchronization signal of said television broadcast signal.

5. A character display apparatus for an intelligence television according to claim 2, further comprising:

a microcomputer which outputs an actuating signal to instruct said information processing system to receive said communication service information from said value added communication network and which outputs said on screen display signal to said display driver.

6. A character display apparatus for an intelligence television according to claim 5, wherein said microcomputer outputs said actuating signal in response to a command input by a user.

7. A character display apparatus for an intelligence television according to claim 4, further comprising:

a microcomputer which outputs an actuating signal to instruct said information processing system to receive said communication service information from said value added communication network.

8. A character display apparatus for an intelligence television according to claim 1, wherein said information processing system comprises:

a FIFO memory which stores and outputs said communication service information according to a reference clock signal; and display position setting means for inputting said communication service information from said FIFO memory and outputting said screen information signal.

9. A character display apparatus for an intelligence television according to claim 8, wherein said display position setting means determines a display position at which said communication service information is to be displayed on said display and outputs a corresponding switching control signal, and wherein said signal switching means selects and switches between said screen information signal and said television broadcast signal in accordance with said switching control signal.

10. A character display apparatus for an intelligence television according to claim 9, wherein said information processing system generates said switching control signal based on a horizontal synchronization signal and a vertical synchronization signal of said television broadcast signal.

11. A character display apparatus for an intelligence television which is capable of simultaneously displaying a television broadcast signal and a communication signal corresponding to communication service information supplied via a value added communication network, said apparatus comprising:

an information processing system which receives said communication service information from said value added communication network and outputs a corresponding screen information signal and a switching control signal;

signal switching means for selecting and switching between said screen information signal and said television broadcast signal based on said switching control signal and for outputting a corresponding selected signal;

a display driver which inputs said selected signal, superimposes an on screen display signal onto said selected signal to produce a superimposed signal, and outputs said superimposed signal to a display; and a microcomputer which outputs an actuating signal to instruct said information processing system to receive said communication service information from said value added communication network and which outputs said on screen display signal to said display driver.

*12. An information data display apparatus for driving a video display device capable of selectively or simultaneously displaying visual images corresponding to a television broadcast signal or information data supplied via a network, said apparatus comprising:*

*an information processing system receiving said information data from said network and providing a screen information signal corresponding to said information data;*

*a signal switch providing a corresponding selected signal by selectively switching between said screen information signal and said television broadcast signal; and*

*a display driver providing said corresponding selected signal to drive the video display device in response to reception of said corresponding selected signal.*

*13. The information data display apparatus of claim 12, further comprised of said display driver generating a superimposed signal by superimposing an on screen display signal onto said corresponding selected signal, and providing said superimposed signal to drive the display device.*

*14. The information data display apparatus of claim 13, further comprising a microcomputer generating an actuating signal to instruct said information processing system to receive said information data from said network and applying said on screen display signal to said display driver.*

*15. The information data display apparatus of claim 14, further comprised of said microcomputer generating said actuating signal in response to a command input by a user.*

*16. The information data display apparatus of claim 12, further comprised of:*

*said information processing system generating a switching control signal; and*

*said signal switch selective switching between said screen information signal and said television broadcast signal in accordance with said switching control signal.*

*17. The information data display apparatus of claim 16, further comprised of said information processing system generating said switching control signal based on a horizontal synchronization signal and a vertical synchronization signal carried by said television broadcast signal.*

*18. The information data display apparatus of claim 17, further comprising a microcomputer generating an actuating signal to instruct said information processing system to receive said information data from said network.*

*19. The information data display apparatus of claim 12, further comprised of said information processing system comprising:*

*a memory writing and reading said information data in accordance with a reference clock signal; and*

*a position setting stage receiving said information data from said memory and outputting said screen information signal.*

*20. The information data display apparatus of claim 19, further comprised of:*

*said display position setting stage generating a switching control signal indicative of a location for presentation of said information data among said visual images presented on said video display device; and*

*said signal switch selectively switching between said information data and said television broadcast signal in accordance with said switching control signal.*

*21. The information data display apparatus of claim 20, further comprised of said information processing system generating said switching control signal based on horizontal synchronization signals and vertical synchronization signals carried by said television broadcast signal.*

*22. An information data display apparatus for driving a video display device capable of selectively or simultaneously displaying visual images corresponding to a television broadcast signal or information data supplied via a network, said apparatus comprising:*

*an information processing system receiving information data from said network and providing a screen information signal corresponding to said information data, and a switching control signal;*

*a signal switch providing a corresponding selected signal by selectively switching between said screen information signal and said television broadcast signal in dependence upon said switching control signal;*

*a display driver driving the video display device with a superimposed signal generated by superimposing an on screen display signal onto said corresponding selected signal; and*

*a microcomputer generating an actuating signal to instruct said information processing system to receive said information data from said network and applying said on screen display signal to said display driver.*

*23. The information data display apparatus of claim 22, further comprised of a memory writing and reading said information data in accordance with a reference clock signal derived from a vertical blanking interval of said television broadcast signal when an information key is activated by a user.*

*24. The information data display apparatus of claim 22, further comprised of said information processing system receiving said information data via a communication service operatively coupled to said apparatus.*

*25. The information data display apparatus of claim 22, further comprised of:*

*said information processing system receiving said information data via another television broadcast signal;*

*a display position setting stage generating said switching control signal as indicative of a location for presentation of said information data among said visual images; and*

*said signal switch selectively switching between said information data and said television broadcast signal in accordance with said switching control signal.*

*26. The information data display apparatus of claim 22, further comprised of said information processing system receiving said information data via another television broadcast signal.*

*27. The information data display apparatus of claim 22, further comprised of said signal switch receiving said television broadcast signal via a communication service operatively coupled to said apparatus.*

*28. An information data display apparatus, comprising:*

*an information processing system receiving information data from a network and providing a screen information signal corresponding to said information data;*

*a signal switch providing a selected signal by selectively switching between said screen information signal and a broadcast signal;*

*a video display device driven to selectively and simultaneously display visual images corresponding to said selected signal; and*

*a display driver providing said selected signal to drive the video display device in response to reception of said selected signal from said signal switch.*

*29. The information data display apparatus of claim 28, further comprised of said display driver superimposing an on screen display signal onto said selected signal, and driving said display device to visually display on-screen images corresponding to said on screen display signal superimposed upon said visual images corresponding to said selected signal.*

*30. The information data display apparatus of claim 29, further comprising a microcomputer generating an actuating signal to instruct said information processing system to receive said information data from said network and applying said on screen display signal to said display driver.*

*31. The information data display apparatus of claim 30, further comprised of said microcomputer generating said actuating signal in response to a command input by a user.*

*32. The information data display apparatus of claim 28, further comprised of:*

*said information processing system generating a switching control signal; and*

*said signal switch selective switching between said screen information signal and said television broadcast signal in accordance with said switching control signal.*

*33. The information data display apparatus of claim 32, further comprised of said information processing system generating said switching control signal based on a horizontal synchronization signal and a vertical synchronization signal carried by said television broadcast signal.*

*34. The information data display apparatus of claim 33, further comprising:*

*a microcomputer generating an actuating signal; and*

*said information processing system responding to said actuating signal by receiving said information data from said network.*

*35. The information data display apparatus of claim 28, further comprised of:*

*a display position setting stage generating a switching control signal indicative of a location for presentation of said information data among said visual images presented on said visual display; and*

*said signal switch selectively switching between said information data and said television broadcast signal in accordance with said switching control signal.*

*36. The information data display apparatus of claim 35, further comprised of said information processing system generating said switching control signal based on horizontal synchronization signals and vertical synchronization signals carried by said television broadcast signal.*

*37. An information data display process, comprising:*

*receiving first information data from a first communication service;*

*generating a screen information signal corresponding to said information data;*

*providing a selected signal by selectively switching between said screen information signal and second information data received from a second communication service; and*

*driving a video display device to selectively and simultaneously display visual images corresponding to said selected signal, in response to reception of said selected signal.*

*38. The information data display process of claim 37, further comprising:*

*receiving said first information data from a network; and*

*receiving said second information data from a broadcast signal.*

*39. The information data display process of claim 37, further comprised of:*

*superimposing an on screen display signal onto said selected signal; and*

*driving said display device to visually display on-screen images corresponding to said on screen display signal superimposed upon said visual images.*

*40. The information data display process of claim 37, further comprised of generating a switching control signal to regulate said selectively switching based on a horizontal synchronization signal and a vertical synchronization signal carried by said second information data.*

*41. An information data display apparatus, comprising:*

*an information processing system receiving information data from a network, and providing a screen information signal corresponding to said information data and a switching control signal;*

*a signal switch providing a corresponding selected signal by selectively switching between said screen information signal and a television broadcast signal in dependence upon said switching control signal;*

*a display driver selectively generating a visual display to individually and simultaneously display visual images corresponding to said television broadcast signal and said information data by driving a video display device with a superimposed signal generated by superimposing an on screen display signal onto said corresponding selected signal.*

*42. The information data display apparatus of claim 41, further comprising a microcomputer generating an actuating signal to instruct said information processing system to receive said information data from said network and applying said on screen display signal to said display driver.*

*43. The information data display apparatus of claim 41, further comprised of a memory storing said information data in correspondence with a reference clock signal derived from said television broadcast signal when an information key is activated by a user.*

*44. The information data display apparatus of claim 41, further comprised of said information processing system receiving said information data via a communication service operatively coupled to said apparatus.*

*45. The information data display apparatus of claim 41, further comprised of:*

*said information processing system receiving said information data via a different broadcast signal;*

*a display position setting stage generating said switching control signal as indicative of a location for presentation of said information data among said visual images; and*

*said signal switch selectively switching between said information data and said television broadcast signal in accordance with said switching control signal.*

*46. The information data display apparatus of claim 41, further comprised of said information processing system receiving said information data via a different broadcast signal.*

*47. The information data display apparatus of claim 41, further comprised of said signal switch receiving said television broadcast signal via a communication service operatively coupled to said apparatus.*

*48. The information data display apparatus of claim 41, further comprised of:*

*said information processing system receiving said information data via a different broadcast signal; and*

*said signal switch receiving said television broadcast signal via a communication service operatively coupled to said apparatus.*

*49. The information data display apparatus of claim 41, further comprised of:*

*a display position setting stage generating said switching control signal as indicative of a location for presentation of said information data among said visual images presented on said visual display; and*

*said signal switch selectively switching between said information data and said television broadcast signal in accordance with said switching control signal.*

*50. An information data display apparatus, said apparatus comprising:*

*an information processing system receiving information data via a network and providing a screen information signal corresponding to said information data;*

*a signal switch providing a corresponding selected signal by selectively switching between said screen information signal and a television broadcast signal; and*

*a display driver providing said corresponding selected signal to drive a video display device in response to reception of said corresponding selected signal by driving the video display device to selectively and simultaneously display visual images corresponding to said television broadcast signal and information data supplied via said network.*

*51. The information data display apparatus of claim 50, further comprised of a microcomputer generating an actuating signal to instruct said information processing system to receive said information data from said network and applying an on screen display signal to said display driver.*

*52. The information data display apparatus of claim 50, further comprised of:*

*a memory writing and reading said information data in accordance with a reference clock signal; and*

*a position setting stage receiving said information data from said memory and outputting said screen information signal.*

* * * * *